United States Patent
Whitnah et al.

[11] 3,735,411
[45] May 22, 1973

[54] HIGH-RANGE RESOLUTION RADAR REAL-TIME DISPLAY APPARATUS

[75] Inventors: Richard G. Whitnah, Bremerton, Wash.; Abe Goldstein, Santa Ana, Calif.

[73] Assignee: The United States of America as represented by the Secretary of the Navy, Washington, D.C.

[22] Filed: Aug. 11, 1971

[21] Appl. No.: 170,688

[52] U.S. Cl. .......................................... 343/17.2 R
[51] Int. Cl. .......................... G01s 9/02, G01s 9/12
[58] Field of Search ................... 343/7.3, 17.1 R, 343/17.2 R, 17.2 PC

[56] References Cited

UNITED STATES PATENTS

| | | | |
|---|---|---|---|
| 3,140,489 | 7/1964 | Downie | 343/17.2 R |
| 3,181,156 | 4/1965 | Ward | 343/17.2 R |
| 3,299,427 | 1/1967 | Kondo | 343/17.1 R |
| 3,303,497 | 2/1967 | Chubb | 343/7.3 |
| 3,423,754 | 1/1969 | Gunn | 343/17.2 R |

Primary Examiner—Malcolm F. Hubler
Attorney—R. S. Sciascia et al.

[57] ABSTRACT

A high-range resolution radar display apparatus for generating a composite coarse and fine real-time radar display simultaneously without an intermediate storage system. One display comprises an extended length display which allows an operator to search an extended delta range and is generated by peak detecting range information from narrow bandwidth IF filters. The other display is a limited extent display featuring the maximum resolution capability of the correlation radar system for detailed target examination and is generated by feeding the information from each of the IF filters to common delay line circuitry for making the information, which represents contiguous range samples, contiguous in time.

5 Claims, 3 Drawing Figures

INVENTOR.
ABE GOLDSTEIN
BY RICHARD G. WHITNAH

HIGH-RANGE RESOLUTION RADAR REAL-TIME DISPLAY APPARATUS

CROSS REFERENCES TO RELATED APPLICATIONS

This case is closely related to the following copending patent applications which are hereby incorporated by reference:

a. "A Passive-Active Missile-Seeker System," Ser. No. 174,576, filed on Aug. 13, 1971, by Goldstein et al;

b. "Digital Range Tracking Apparatus for High-Range Resolution Correlation Radars," Ser. No. 173,336, filed on Aug. 13, 1971, by Goldstein et al; and, c. "Automatic Gain Control Circuit for High-Range Resolution Correlation Radar," Ser. No. 174,577, filed on Aug. 13, 1971, by Goldstein et al.

BACKGROUND OF THE INVENTION

In a high resolution radar system where the video pulsewidth from a point source target is essentially equal to the transmitted pulsewidth but the range resolutions cell is many times smaller, the presentation of returns from the many targets to be displayed in appropriate scale and position in real-time requires special consideration. Specifically, in a radar system with range resolution capabilities in the order of 5 feet, the quantity of data possible for presentation to an operator is often beyond his ability to comprehend and beyond the resolution capabilities of available display devices.

Also, the effective resolution length of a radar system is determined by the RF processing bandwidth while the data rate is controlled by the mechanization of the receiver filter channels. However, since the time extent of the receiver output video is often much greater than the system resolution, and if a continuous display sweep is generated each PRF, the display will appear confused to the operator. The present system overcomes these difficulties by providing a special horizontal/vertical and blanking program to generate a composite A-scope type of display.

SUMMARY OF THE INVENTION

A high-range resolution radar real-time display apparatus for generating a composite display is disclosed. An extended range display is generated in a search mode so that targets can be examined for particular extent characteristics prior to initiation of range track, and a high-resolution display is generated in a track mode so that selected targets can be positioned within the actual tracking gate prior to initiation of automatic range track. The composite display is generated by a novel horizontal/vertical and blanking program which makes unnecessary the use of an intermediate storage system. Information from parallel receiver channels is peak-detected to provide video for the extended range display and the high-resolution video is generated by range gating the information at the target range and then progressively delaying each video sample in a common delay line and then serially summing the delayed samples to thereby provide a display of contiguous range sample contiguous in time.

OBJECTS OF THE INVENTION

The primary object of the present invention is to provide a high-range resolution radar real-time display apparatus featuring a dual-display capability.

Other objects, advantages and novel features of the invention will become apparent from the following detailed description of the invention when considered in conjunction with the accompanying drawings.

DESCRIPTION OF THE PREFERRED EMBODIMENT

Figure 1:
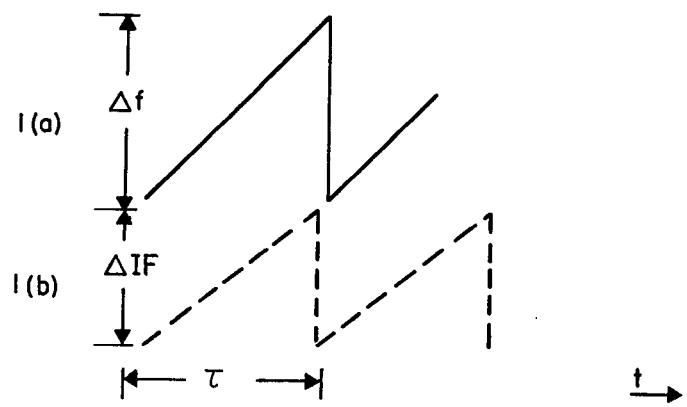
FIG. 1 is a simplified illustration of typical waveforms used in the present invention.
Figure 1:
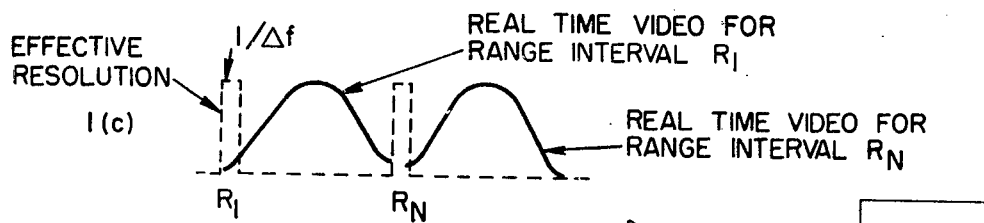
Figure 2:
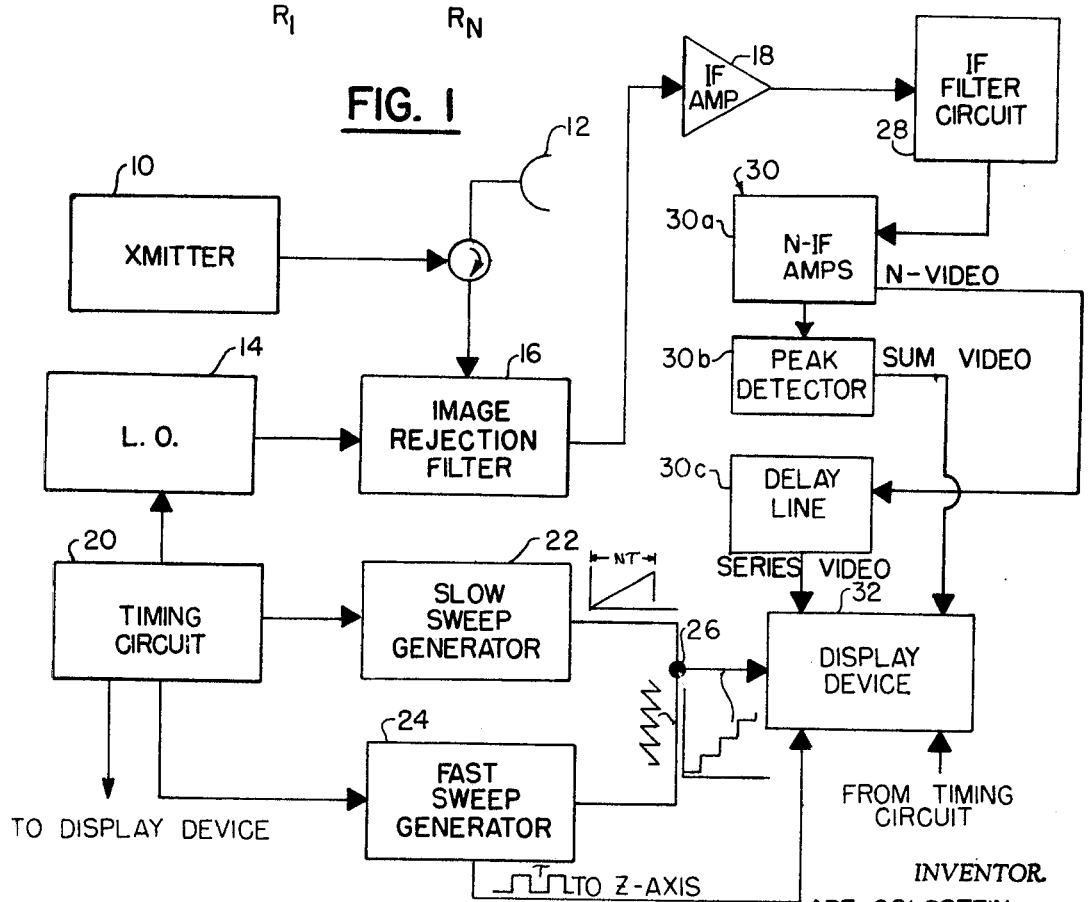
FIG. 2 is a simplified schematic block diagram of a high-range resolution radar system incorporating the present real-time display apparatus.

The embodiment of the present invention shown in FIG. 2 is intended to be used primarily, but not exclusively, with a high-range resolution correlation radar system of the type disclosed in in the above-referenced copending patent application entitled "A Passive-Active Missile-Seeker System". The above referenced patent application fully describes the high-resolution radar system and its operation, therefore it is only necessary to describe it herein in brief form using exemplary values. Essentially, the system uses a transmitted linear FM waveform, as shown in FIG. 1(a), which is processed in a receiver to yield an active filtering form of pulse compression. Parallel receiver processing is used to maintain data rate while generating an analog form of range tracking and while generating an accurate antenna pointing angle output by means of sequential lobing (conical) error generation.

The system shown in FIG. 2 generates a radar capable of discriminating against point reflectors located within a gated pulse length ($\tau$) of each other. The transmitter 10 transmits 200-MC FM (chirp) signals by means of a four-quadrant, flat-plate array antenna 12. A corresponding local oscillator signal, as shown in FIG. 1(b), is generated by the local oscillator 14. The L.O. signal consists of eight recurrent sweeps for a 1 usec duration and has a retrace time of 0.28 usec whereby the total time required for eight sweeps corresponds to a range of 5120-feet which is defined as the positionable delta range for range lock-on.

The returned signal is correlated with the generated L.O. signal in the image rejection mixer 16 whose output is fed through an IF amplifier 18 to the IF filter circuit 28 comprising N-IF narrow bandpass filters. Timing signals are provided by the timing circuit 20.

As shown in FIG. 1(a), the high resolution radar system transmits a pulse of width, $\tau$, and which is swept over the frequency spectrum $\Delta f$. As shown in FIG. 1(b), the receiver local oscillator signal is offset by $\Delta IF$ and swept through the same $\Delta f$ as the transmitted spectrum in time, $\tau$, at a delayed time. As shown in FIG. 1(c), a target whose range, $R_1$, in radar time is equivalent to the start of the local oscillator sweep will appear at the output of the radar mixer at the IF frequency and will have most of its energy contained in a bandwidth $1/\tau$ centered at the IF frequency. When detected in the filter circuit 28, the resultant video will have a width approximately equal to $\tau$.

The effective resolution or pulsewidth is, however, equal to $1/\Delta f$ because, if the local oscillator sweep were started $1/\Delta f$ later, the same target at $R_1$ would be outside of the IF passband. Conversely, if the target were located at a distance equal to $1/\Delta f \times C/2$ closer or further in range, and if the L.O. sweep time were constant, the same result would obtain. To examine the range cells $1/\Delta f$ between $R_1$ and $R_N$, the L.O. sweep must therefore be started $1/\Delta f$ later each successive PRF, or a plurality (N) IF filters spaced at $1/\tau$ through $\Delta f$ must be used in the filter circuit 28.

Thus, the output of the mixer 16 is processed in at least eight parallel filter channels in the IF filter circuit 28. Each channel provides information about a 5 foot extent of range return which is the selectively predetermined range resolution for the radar system of FIG. 2. Since each filter channel represents a 5 foot range sample per L.O. sweep, and since eight receiver channels are used for display generation, a 40 foot range sample is generated per L.O. sweep.

Therefore since each L.O. sweep can generate only a 40 foot range sample, there must be sixteen [(1.28 × 500/40)] L.O. patterns to provide a complete sample of the 5,120 foot (one nautical mile) extent. However since it is necessary to examine the target for particular extent characteristics prior to initiation of range track, and since it is advantageous to position the selected target within the actual tracking gate prior to initiation of automatic range track, the system is provided with a dual display capability. That is, the display has two traces. One trace comprises a 5,120 foot extent, while the other is a high-range resolution display encompassing only a 40 foot range extent. A complete interpulse period is required to generate the second extent display mode.

The high-range resolution information as generated by the range sampling technique is appropriately "sorted" for presentation to the display device 32 with real-time processing for system operation verification. That is, since the range is sampled at discrete intervals each PRF (at a range spacing determined by the transmitted pulse of $\tau - 1.0$ usec and the recovery time of 0.28 usec for the local oscillator linear FM sweep generator), the sampled length is determined by the number of parallel narrowband receiver channels employed. The effective resolution length of system is determined by the RF processing bandwidth for the data rate is controlled by the design of the parallel channels.

Figure 3:
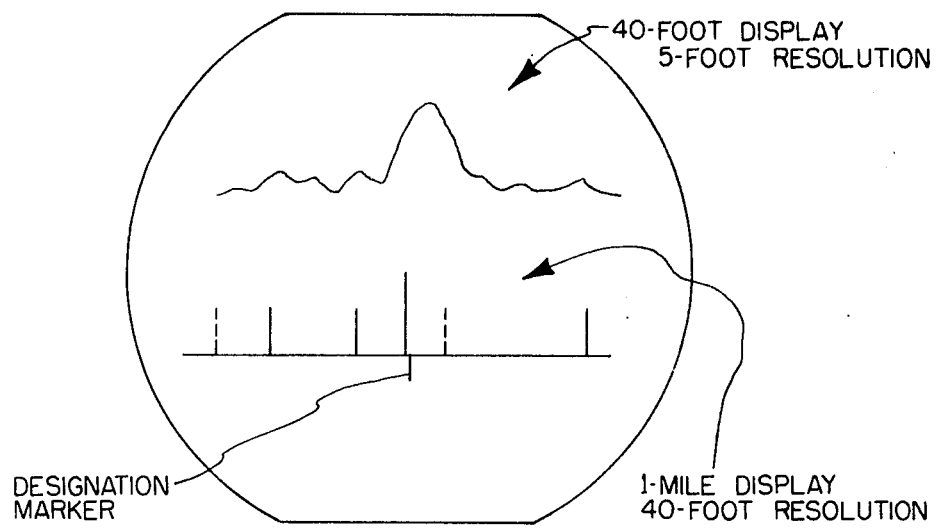
FIG. 3 is a simplified illustration of an exemplary real-time dual-trace display.

However, since the time extent of the receiver output video is much greater than the system resolution, and if a continuous display sweep is generated each PRF, the display would appear confusing to the operator. To overcome this difficulty, the system is designed to provide a special horizontal/vertical and blanking program to generate two displays on a common scope as shown in FIG. 3. The lower trace comprises an extended length (1 mile) manually selected trace which allows an operator to search an extended (delta) range. This display has an effective resolution of N (where N is the number of parallel IF filter channels) times the system range resolution so that the target detection properties of the high resolution system can be maintained while the operator is given an extended display for target location and identification. A target designation marker (gate) is displayed as a negative deflection below the 1-mile display video to facilitate target selection and as described in the above-referenced copending patent application entitled "A Passive-Active Missile-Seeker System."

The upper trace comprises a limited extent display generated during track mode and featuring the maximum resolution capability of the correlation radar system (e.g., 5 feet) for detailed target examination. In FIG. 3, the upper trace presents a 40 foot range interval starting at the target designation gate, thus allowing high resolution examination of a selected target.

The 1 mile trace is generated during search mode by peak-detecting the 40 foot IF range information output from each of the eight filter channels doing eight successive L.O. sweeps and sixteen PRF's. The detected IF signals from the eight gaussian filters are amplified in the N-IF amplifiers 30a and "OR'D" in the peak detector ("OR" gate) 30b to provide peak detection of the largest 5 foot resolution return within the 40 foot interval examined by a given L.O. sweep.

This output is termed the sum video and is used to present the 1 mile, 40 foot resolution display. The "OR'D" video signal from the eight channels (assuming a target is present) will be of 1.0 usec duration. However, 1.0 usec represents 500 feet of radar range. Thus to display the proper target resolution at the proper range, the sum video must be compressed by a factor of 16 and must appear at the start of the associated L.O. sweep.

It can be seen that on one PRF, a total of only eight targets may be presented and would appear at 1.25 usec intervals. To provide returns in the other fifteen 40 foot intervals the L.O. sweep and display timing must be stepped 80 nsec on each successive PRF, thereby filling in the total one-mile search. A trigger synchronous with the L.O. timing can be used to provide this stepping function.

The 1 mile search sweep is generated by summing a slow (11.5 usec sweep from the sweep generator 22 with a fast (1.0 usec) sweep from the sweep generator 24. The slow sweep is started in synchronization with the receiver L.O. sweep at a delayed range $R_1$, and the fast sweep is started at the beginning of each L.O. sweep.

When summed, the sweeps produce at point 26 a "staircase" sweep which is then applied to the horizontal axis of the display device (CRT) 32. The 1.0 usec video pulse is caused to dwell by virtue of the horizontal sweep and appears to be 40 feet or 80 nsec wide. The horizontal sweep then steps to the next receiver L.O. sweep position in 80 nsec, making the next target (if present) appear to be 640 feet further out in range, i.e., 1.25 usec.

The "staircase" sweep will thus cause video signals having a pulsewidth equal to $\tau$ and which are applied to the vertical axis of the display device to appear in real-time, in the proper range sequence and with a pulsewidth commensurate with the effective resolution of the system. On successive PRF's the timing of the L.O. 14 is moved $N/\Delta f$ to cover the range of interest.

In other words, the horizontal trace appears as a "staircase" voltage so that the display trace is deflected in the vertical plane an amount proportional to received target amplitude for approximately the duration of the received energy (equal to the transmitted pulse length). As the new range sample is generated by retriggering the linear FM sweep generator, the step horizontal voltage occurs to position the beam in a display position compatible to the next range sample. Simultaneously with the step horizontal voltage, a blanking pulse is applied to the display Z-axis to "clamp" the display beam and prevent displaying information as the beam shifts along the horizontal axis. By continuation of this process and by controlling precisely the horizontal deflection voltage, the search video is "sorted" directly onto the display without the requirement for an intermediate information storage and retrieval system. In this manner a real-time display is generated.

The high resolution display is presented on the second trace every 17th PRF period and is the only trace presented in track mode at which time it appears every PRF. The start time occurs at the same range as the target gate on the 1 mile display, and in operation, the range delay is manually varied until a target of interest is positioned at the range gate, at which time the target will appear on the upper trace. In the track mode, the center of the display will track a chosen target.

The high resolution display is generated as follows. The eight filter channels of contiguous 5 foot range intervals are gated for 1.0 usec at the target range. All of these signals (for an extended range) occur simultaneously within 80 nsec. Since the duration of each video pulse is 1.0 usec, each successive 5 foot range interval must be delayed 1.0 usec ($\tau - 1/\Delta f$) more than the preceding range and then summed together.

Thus range one video (0–5 feet) occurs without delay and range eight video (35–40 feet) is delayed 7.0 usec, and the total display is 40 feet in 8.0 usec or 5 feet/usec. The video thus delayed is simply presented (contiguous in time) using a linear sweep of more than 8.0 usec.

A single tapped delay line 30c of 7.0 usec duration is used to perform the successively increasing delay from the first to the last channel and also performs the summing function. Impedance matching of the multiple inputs to the delay line is accomplished by the use of constant current drivers.

Thus it can be seen that a new and novel real-time display apparatus for high-range resolution correlation radars has been disclosed.

Obviously many modifications and variations of the present invention are possible in the light of the above teachings. It is therefore to be understood that within the scope of the appended claims the invention may be practiced otherwise than as specifically described.

What is claimed is:

1. In a high-range resolution correlation radar system wherein returned signals are correlated with local oscillator sweeps and wherein parallel receiver processing is utilized including a plurality of IF filter channels, real-time display apparatus comprising:

IF amplifier means connected to the output of each of said filter channels wherein each of said filter channels provides a range sample per local oscillator sweep corresponding to a target length equal to the range resolution of said radar system and wherein said range samples comprise contiguous range information;

first means connected to the output of said amplifier means and being responsive to the contiguous range information output thereof, when said radar system is in a search mode, to generate an extended length display, said extended length corresponding to the total sweep time of a selectively predetermined number of sweeps of said local oscillator;

said first means including means for peak-detecting the range information output of said filter channels to produce first video signals corresponding to the largest output thereof to be applied to the vertical axis of a display device;

means for generating a slow sweep in synchronization with said local oscillator sweeps and a fast sweep at the beginning of each local oscillator sweep;

means for summing said slow sweep and fast sweep to produce a staircase voltage, to be applied to the horizontal axis of said display device, wherein said first video signals will be displayed in real-time;

second means connected to the output of said amplifier means and being responsive to the range information output thereof, when said radar system is in a track mode, to generate, every PRF, a high resolution display corresponding to the range resolution of said radar system times the number of said filter channels;

said second means including means for gating said range information output at the target range to produce second video signals; and, means for delaying said second video signals successively in a selectively predetermined manner and for summing the resulting delayed signals to thereby produce a real-time display.

2. The apparatus of claim 1 wherein said means for peak-detecting said range information output comprises an "OR"-gate.

3. The apparatus of claim 1 wherein said display device comprises a cathode-ray tube.

4. The apparatus of claim 1 wherein said means for delaying said second video signals comprises a single, tapped delay line having multiple inputs.

5. The apparatus of claim 4 wherein said delay line includes constant current drivers at the multiple inputs thereof for impedance matching.

* * * * *